2,795,503
ICING MIX

Bryant R. Dunshee and Harold M. Keller, St. Paul, Minn., assignors to General Mills, Inc., a corporation of Delaware No Drawing. Application December 20, 1954, Serial No. 476,594

6 Claims. (Cl. 99—139)

The present invention relates to a shortening-sugar composition and more particularly to an icing mix containing shortening and reducing sugars.

It has been found that in icing compositions containing shortening and a reducing sugar an off flavor develops upon storage. This off flavor develops rapidly in compositions containing a reducing sugar such as invert sugar or glucose. It is not encountered in similar compositions containing only sucrose. This off flavor is noted particularly in compositions which have a delicate flavor. Presumably the same off flavor is encountered in other more highly flavored compositions but apparently the higher level of flavoring tends to mask the off flavor resulting from some possible reaction between the reducing sugar and the shortening. In any event a definite off flavor is observed in compositions containing shortening and reducing sugars. This off flavor is not a rancid flavor commonly associated with shortening. Thus even though the shortening is stabilized by the usual antoxidants the off flavor develops in combination with the reducing sugar.

It has now been discovered that it is possible to prevent the development of an off flavor in products of this type by the inclusion therein of a compound containing the ene-diol grouping

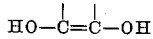

It is, therefore, an object of the present invention to provide a shortening-reducing sugar combination containing a compound having the ene-diol grouping.

The invention is applicable to compositions in general containing the two essential constituents, shortening and the reducing sugar. The invention is applicable to compositions containing only these two constituents and is also applicable to compositions containing these constituents in combination with other constituents such as non-reducing sugars, starch, salt, vanilla, water and the like. The invention is applicable to powdered dry icing mixes as well as to finished icing compositions containing water. While all of the above variations are possible the invention will be described with particular reference to dry powdered icing compositions embodying the invention.

The stabilizing materials employed in the present invention are those containing the ene-diol grouping. The most common material available for this purpose is L-ascorbic acid. Other materials, however, containing this grouping may also be used. Typical of such other compounds are reductone, dihydroxymaleic acid, analogues and isomers of ascorbic acid such as gluco-ascorbic acid and araboascorbic acid. These materials are used in a quantity sufficient to stabilize the composition against the development of the off flavor. Levels as low as 0.025% based on the combined weight of the shortening and the reducing sugar have been found effective. A higher degree of protection is obtained when the quantity of the stabilizing material is employed at approximately 0.1%. Generally it is not necessary to go above approximately 0.1% but higher levels up to 0.5% may be used without any adverse effect on the properties of the composition.

In preparing the dry icing mix the dry ingredients are blended first with the stabilizing material and then the shortening is mixed with the blend of the dry ingredients.

In a non-stabilized composition the off flavor is detected when the dry mix is mixed with water to produce a creamy frosting. Accordingly, stored icing compositions are first made up into an aqueous icing composition before they are subjected to the test. The rate of off flavor development is dependent upon the quantity of reducing sugar present. However, in compositions containing as little as 2½% invert sugar the off flavor development is still appreciable. Any type of shortening may be employed either stabilized with antioxidants or not. The percent of shortening employed may be varied widely depending upon the desired texture of the icing mix. Generally from 7–18% is suitable for the production of a dry icing mix.

In the following examples ascorbic acid has been used as the stabilizing agent. This may be in the form of isolated ascorbic acid or of a dried lemon juice powder containing the ascorbic acid. The other compounds having the ene-diol grouping may be substituted for the ascorbic acid with similar results.

*Example 1*

A control icing mix was prepared from 77.03 parts by weight of a 90–10 sucrose-invert sugar mixture, 12.50 parts of shortening, 10.0 parts of wheat starch, 0.29 part of salt, 0.18 part of vanilla. A similar composition was prepared containing 0.15 part of lemon powder, the lemon powder replacing an equivalent weight of the sugar mixture. A third composition was prepared containing the same ingredients as the control with the exception that it contained 0.10 part of ascorbic acid, the ascorbic acid replacing an equivalent weight of the sugar mixture. These products were stored at 100° F. for varying periods of time. At the end of the storage period the dry mix was converted into a smooth creamy icing by the addition of water. The icing was then subjected to a taste test to detemine the development of off flavor. The results are indicated in the following table:

| Storage Period | Sample | | |
|---|---|---|---|
| | 1. Control | 2. Lemon powder | 3. Ascorbic acid |
| 4 weeks | satisfactory to slightly off. | excellent | excellent. |
| 8 weeks | moderate to definitely off. | good | good. |
| 12 weeks | do | slightly off | Do. |
| 16 weeks | not edible | moderately off | Do. |

The following data are given to show that commonly employed commercial antioxidants are not effective for the purpose of preventing the development of this off flavor. A dry shortening mix was prepared from the following ingredients: 77.03% of a 90–10 sucrose-invert mixture, shortening 12.50%, wheat starch 10.0%, salt 0.29, and vanilla 0.18. This composition was employed as a control. A second composition was prepared having the same ingredients in the same proportions except that it contained 0.2% of distearyl citrate based on the weight of the shortening. A third composition having the same ingredients in the same proportions but containing 0.1% of a mixture of butylated hydroxyanisole, citric acid and propylgallate, based on the shortening. A fourth composition was prepared having the same composition as the control except that it contained 0.1% of carboxymethyl-mercapto-succinic acid. The compositions were stored at 100° F. as referred to above and then tested for the development of off flavor. The results are indicated in the following table:

| Storage Period | Sample | | | |
|---|---|---|---|---|
| | 1. Control | 2 | 3 | 4 |
| 4 weeks | sl. off | v. sl. off | v. sl. off | sl.-mod. off. |
| 8 weeks | mod. off | sl. off | sl. off | sl.-mod. off. |
| 12 weeks | not edible | mod. off | mod. off | not edible. |

*Example 2*

A series of icing mixes were prepared, the control containing 77.03% of a 90–10 sucrose-invert sugar combination, 12.50% shortening, 10% wheat starch, 0.29% salt, 0.18% vanilla. The other samples in this series differed from the control in the inclusion of certain additives which replaced part of the sugar. These additives are as follows: No. 2, 0.10% ascorbic acid, No. 3, 0.05% ascorbic acid, No. 4, 0.025% ascorbic acid, No. 5, 0.10% sodium ascorbate. In samples 1 to 5 the shortening contained lecithin but no added antioxidants. In samples 6 to 8 the shortening contained lecithin, butylated hydroxyanisole and citric acid. Sample 6 was a control having the same percentage composition as control No. 1. Sample No. 7 contained 0.10% ascorbic acid, sample No. 8 contained 0.05% ascorbic acid. These samples were stored at 100° F. and then tested as described in the preceding example. The results are indicated in the following table:

| Storage Period | 1 | 2 | 3 | 4 | 5 | 6 | 7 | 8 |
|---|---|---|---|---|---|---|---|---|
| 4 weeks | sl. off. | excellent. | good | good | satisfactory. | sl. off. | excellent. | satisfactory. |
| 8 weeks | mod. off. | good | do | do | do | mod. off. | good | sl. off. |

*Example 3*

In this example a small quantity of citric acid was included in some of the samples and found to have a beneficial effect. In this example sample 1 was the same control as sample 1 in the preceding example. Sample 2 differed in the inclusion of 0.05% citric acid. Sample 3 contained 0.05% citric acid and 0.05% ascorbic acid. Sample 4 was the same control as sample 6 in the preceding example. Sample 5 differed from sample 4 in the inclusion of 0.05% citric acid and sample 6 included 0.05% citric acid and 0.05% ascorbic acid, but was otherwise the same as sample 4. The results on storage are indicated in the following table:

| Storage Period | 1 | 2 | 3 | 4 | 5 | 6 |
|---|---|---|---|---|---|---|
| 6 weeks | sl. off | satisfactory. | good | sl. off | sl. off | good. |
| 8 weeks | not edible. | sl. off | good | mod. off | sl. off | good. |

It should be pointed out that these results are the result of taste tests which in general are quite subjective. They are, therefore, not capable of being reported with mathematical accuracy. Nevertheless the results herein reported are the results of a number of testers and there is a definite pattern of agreement to the effect that there is a definite improvement in the flavor after storage by the inclusion of these ascorbic acid type of compounds as compared with the product stored without the inclusion of this type of compound.

Now, therefore, we claim:

1. A composition of matter comprising shortening and reducing sugar, said composition being stabilized by the inclusion of a compound containing the ene-diol grouping.

2. A composition of matter comprising shortening and reducing sugar, said composition being stabilized by L-ascorbic acid.

3. A dry icing mix containing shortening and a reducing sugar, said dry icing mix being stabilized by a compound containing the ene-diol grouping.

4. A dry icing mix containing shortening and a reducing sugar, said dry icing mix being stabilized by L-ascorbic acid.

5. A dry icing mix containing shortening and a reducing sugar, said dry icing mix being stabilized by from 0.025–0.5% L-ascorbic acid based on the combined weight of the shortening and reducing sugar.

6. A dry icing mix containing shortening and a reducing sugar, said dry icing mix being stabilized by L-ascorbic acid and citric acid.

References Cited in the file of this patent

UNITED STATES PATENTS

| 2,152,170 | Areiter | Mar. 28, 1939 |
| 2,159,986 | Gray et al. | May 30, 1939 |
| 2,285,478 | White et al. | June 9, 1942 |
| 2,355,031 | Musher | Aug. 1, 1944 |